(12) United States Patent
Yang et al.

(10) Patent No.: US 11,700,087 B2
(45) Date of Patent: *Jul. 11, 2023

(54) METHOD AND APPARATUS FOR TRANSMITTING AND RECEIVING WIRELESS SIGNAL IN WIRELESS COMMUNICATION SYSTEM

(71) Applicant: LG Electronics Inc., Seoul (KR)

(72) Inventors: Suckchel Yang, Seoul (KR); Hyunsoo Ko, Seoul (KR); Eunsun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 53 days.

This patent is subject to a terminal disclaimer.

(21) Appl. No.: 17/346,943

(22) Filed: Jun. 14, 2021

(65) Prior Publication Data

US 2021/0306126 A1 Sep. 30, 2021

Related U.S. Application Data

(63) Continuation of application No. 16/359,454, filed on Mar. 20, 2019, now Pat. No. 11,050,545, which is a
(Continued)

(51) Int. Cl.
*H04L 27/26* (2006.01)
*H04L 5/00* (2006.01)
(Continued)

(52) U.S. Cl.
CPC .......... *H04L 5/0007* (2013.01); *H04L 1/1819* (2013.01); *H04L 5/00* (2013.01);
(Continued)

(58) Field of Classification Search
CPC ......... H04L 5/00; H04L 27/26; H04L 5/0094; H04L 27/2602; H04L 5/0078;
(Continued)

(56) References Cited

U.S. PATENT DOCUMENTS 11,018,838 B2 * 5/2021 Yang .................... H04L 27/2602
11,050,545 B2 * 6/2021 Yang .................... H04L 27/2607
(Continued)

FOREIGN PATENT DOCUMENTS

| CN | 101127551 | 2/2008 |
| CN | 104012159 | 8/2014 |

(Continued)

OTHER PUBLICATIONS

Office Action in Russian Appln. No. 2019134776, dated Feb. 28, 2022, 13 pages (with English translation).
(Continued)

*Primary Examiner* — Anez C Ebrahim
(74) *Attorney, Agent, or Firm* — Fish & Richardson P.C.

(57) ABSTRACT

The present invention relates to a wireless communication system, more specifically, to a method and an apparatus therefor, the method comprising the steps of: merging a first cell having a first TTI and a second cell having a second TTI, the length of the second TTI being N (N>1) times the length of the first TTI; receiving data scheduling information for the second cell in the first TTI of the first cell; and establishing data communication on the basis of the data scheduling information in the second TTI of the second cell corresponding to the first TTI of the first cell, wherein the first TTI for the first cell is any one TTI from among the N number of TTIs of the first cell corresponding to the second TTI of the second cell.

21 Claims, 14 Drawing Sheets

Related U.S. Application Data continuation of application No. 16/065,429, filed as application No. PCT/KR2017/006284 on Jun. 15, 2017, now Pat. No. 11,018,838.

(60) Provisional application No. 62/382,772, filed on Sep. 1, 2016, provisional application No. 62/372,327, filed on Aug. 9, 2016, provisional application No. 62/350,204, filed on Jun. 15, 2016.

(51) Int. Cl.
| | |
|---|---|
| *H04W 72/12* | (2023.01) |
| *H04W 72/23* | (2023.01) |
| *H04L 1/1812* | (2023.01) |
| *H04W 72/0446* | (2023.01) |
| *H04W 72/0453* | (2023.01) |

(52) U.S. Cl.
CPC .......... *H04L 5/0032* (2013.01); *H04L 5/0082* (2013.01); *H04L 5/0094* (2013.01); *H04L 27/26* (2013.01); *H04L 27/2602* (2013.01); *H04L 27/2607* (2013.01); *H04W 72/0446* (2013.01); *H04W 72/0453* (2013.01); *H04W 72/12* (2013.01); *H04W 72/23* (2023.01); *H04L 27/26025* (2021.01)

(58) Field of Classification Search
CPC ..... H04L 5/0082; H04L 5/001; H04L 5/0032; H04L 1/1819; H04L 27/2607; H04L 5/0007; H04W 72/1289; H04W 72/14; H04W 72/12; H04W 72/0453; H04W 72/042; H04W 72/0446
See application file for complete search history.

(56) References Cited

U.S. PATENT DOCUMENTS

| | | |
|---|---|---|
| 2014/0362747 A1 | 12/2014 | Yang et al. |
| 2015/0270932 A1 | 9/2015 | Agiwal et al. |
| 2015/0351093 A1 | 12/2015 | Au et al. |
| 2018/0332605 A1 | 11/2018 | Pelletier |
| 2018/0337752 A1 | 11/2018 | Choi et al. |
| 2019/0104551 A1 | 4/2019 | Deenoo et al. |
| 2019/0386797 A1 | 12/2019 | Yang |

FOREIGN PATENT DOCUMENTS

| | | |
|---|---|---|
| CN | 104081862 | 10/2014 |
| EP | 2903375 | 8/2015 |
| EP | 3340710 | 6/2018 |
| JP | 2016506199 | 2/2016 |
| JP | 2016507186 | 3/2016 |
| KR | 1020120133892 | 12/2012 |
| KR | 101445180 | 9/2014 |
| KR | 1020150070366 | 6/2015 |
| KR | 1020150105353 | 9/2015 |
| KR | 1020150106951 | 9/2015 |
| KR | 102077042 | 2/2020 |
| KR | 20200085377 | 7/2020 |
| KR | 102252515 | 5/2021 |
| RU | 2529198 | 9/2014 |
| RU | 2536816 | 12/2014 |
| RU | 2572566 | 1/2016 |
| WO | WO2014017854 | 1/2014 |
| WO | WO2016004634 | 1/2016 |
| WO | WO2016039559 | 3/2016 |
| WO | WO2016040290 | 3/2016 |
| WO | WO2016064049 | 4/2016 |
| WO | WO2016064059 | 4/2016 |
| WO | WO2016064310 | 4/2016 |

OTHER PUBLICATIONS

Notice of Allowance in Korean Appln. No. 10-2021-7014093, dated Jan. 6, 2022, 3 pages (with English translation).
EP Extended European Search Report in European Appln. No. 17813620.6, dated Jan. 17, 2020, 10 pages.
Ericsson, "NB-IoT—Uplink control information," R1-161875, 3GPP TSG-Ran1—Ad Hoc NB-IoT, Sophia Antipolis, France, dated Mar. 22-24, 2016, 6 pages.
Ericsson, "Short TTI operation with Carrier Aggregation," 3GPP TSG RAN WG1 Meeting #84bis, dated Apr. 11-15, 2016, 4 pages.
Huawei et al., "Discussion on UL scheduling timing for short TTI," 3GPP Draft; R1-164064, 3rd Generation Partnership Project (3GPP), Mobile Competence Centre; 650, Route Des Lucioles; F-06921 Sophia-Antipolis Cedex; France, vol. RAN WG1, No. Nanjing, China, 2016.
Huawei et al., "Discussion on UL scheduling timing for short TTI," 3GPP TSG RAN WG1 Meeting #85, dated May 23-27, 2016, 4 pages.
IN Office Action in Indian Appln. No. 201817046933, dated Nov. 17, 2020, 14 pages (with English translation).
JP Office Action in Japanese Appln. No. 2018-566301, dated Oct. 1, 2019, 5 pages (with English translation).
KR Notice of Allowance in Korean Appln. No. 10-2020-7019517, dated Feb. 8, 2021, 3 pages (with English translation).
LG Electronics, "PDSCH/PUSCH coverage enhancement for MTC," R1-134394, 3GPP TSG RAN WG1 Meeting #74bis, Guangzhou, China, dated Oct. 7-11, 2013, 5 pages.
LG Electronics, "Remaining issues on NB-PDCCH," R1-162458, 3GPP TSG RAN WG1 Meeting #84bis, Busan, Korea, dated Apr. 11-15, 2016, 5 pages.
PCT International Search Report in International Appln. No. PCT/KR2017/006284, dated Sep. 20, 2017, 9 pages.
RU Notice of Allowance in Russian Appln. No. 2019100432, dated Aug. 29, 2019, 16 pages (with English translation).
U.S. Final Office Action in U.S. Appl. No. 16/359,454, dated Apr. 30, 2020, 10 pages.
U.S. Office Action in U.S. Appl. No. 16/065,429, dated Apr. 3, 2020, 11 pages.

* cited by examiner

[FIG. 1]
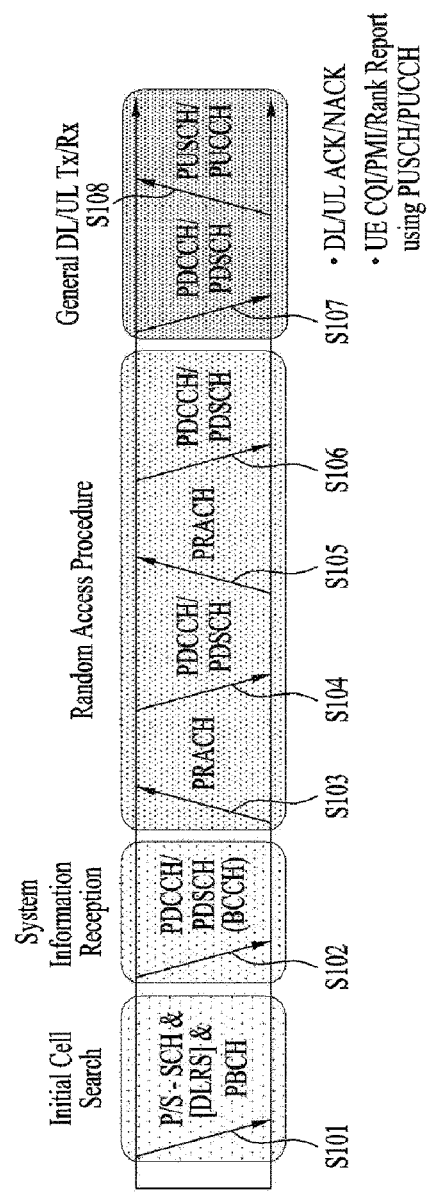

[FIG. 2]
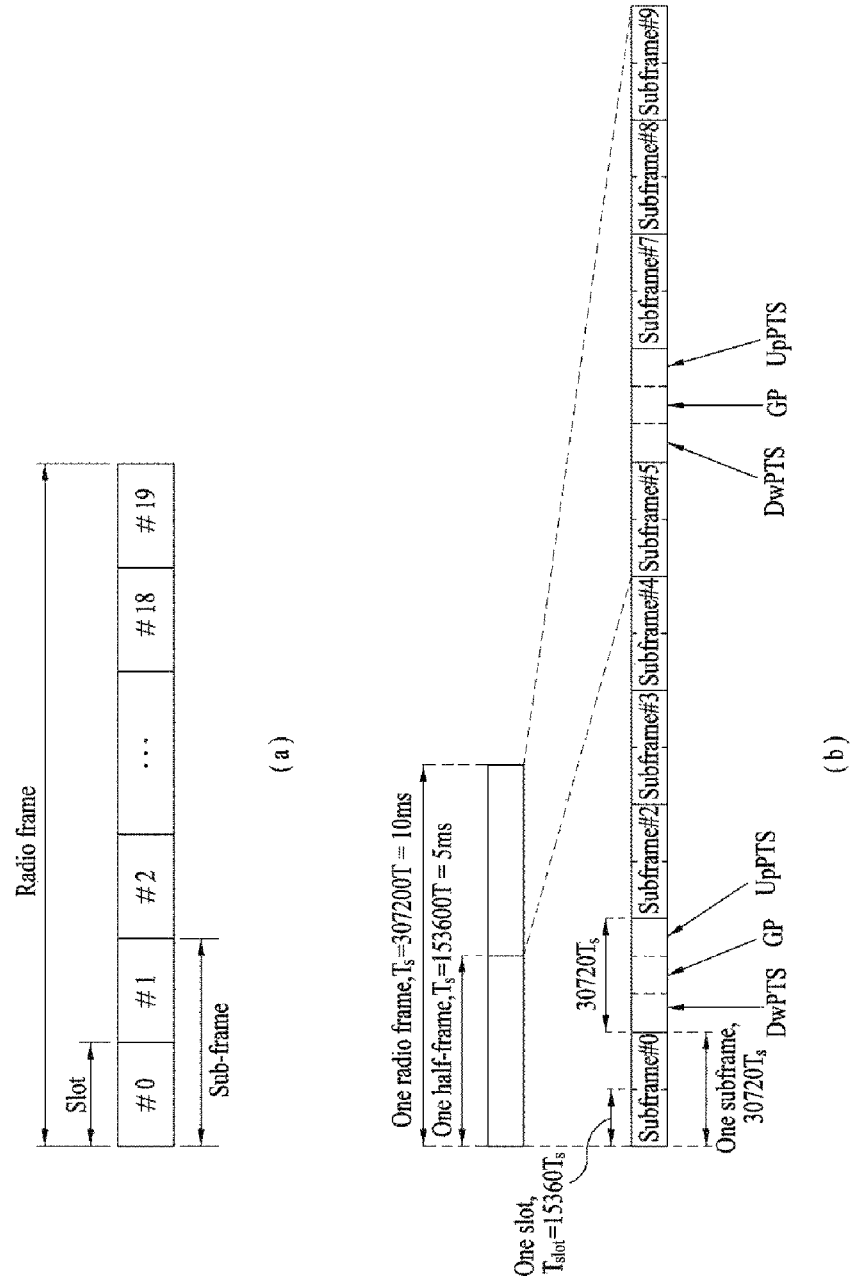

[FIG. 3]
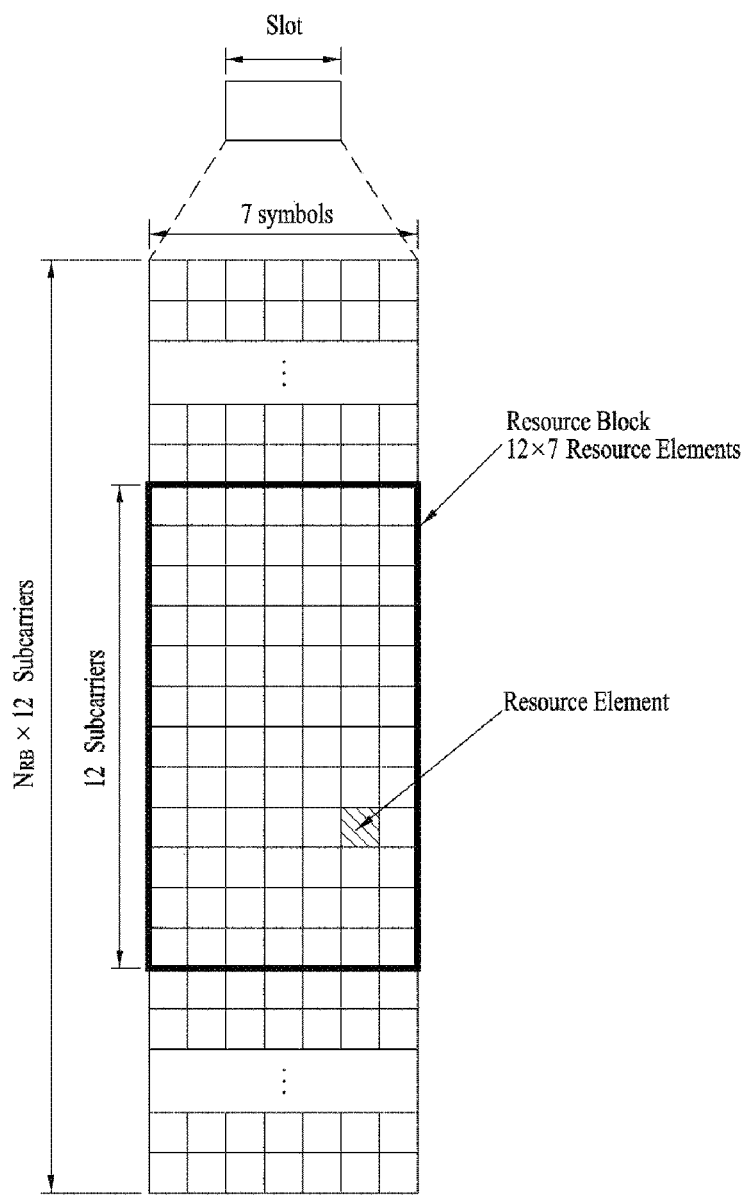

[FIG. 4]
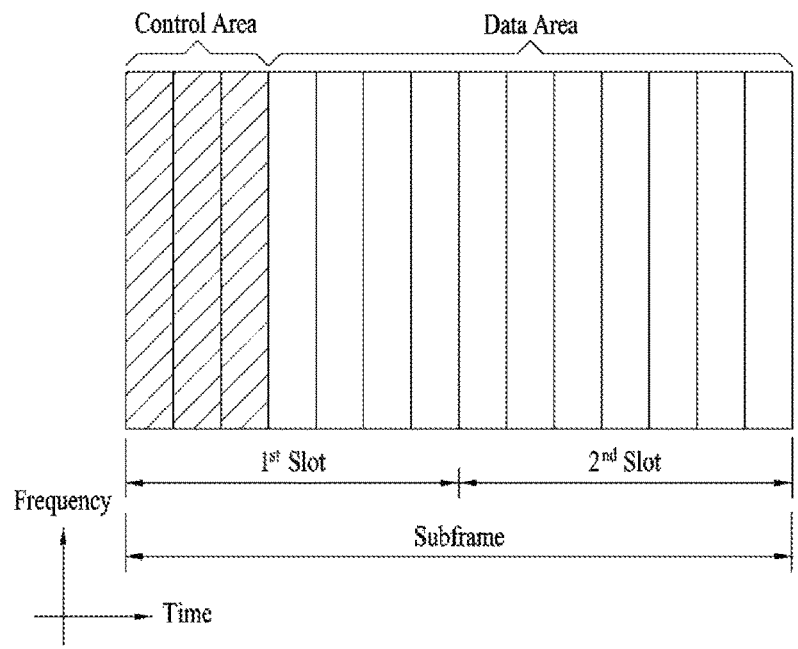
[FIG. 5]
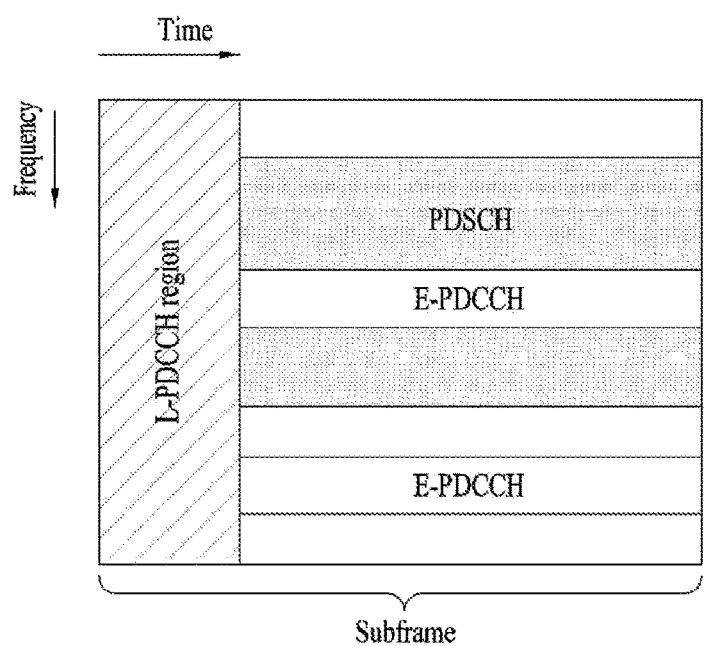

[FIG. 6]
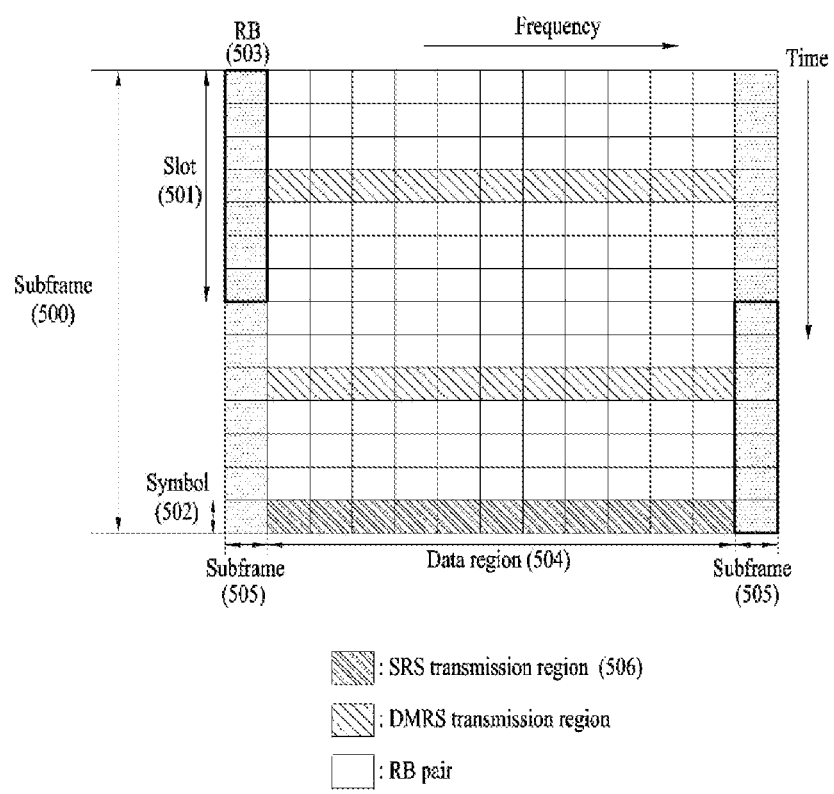

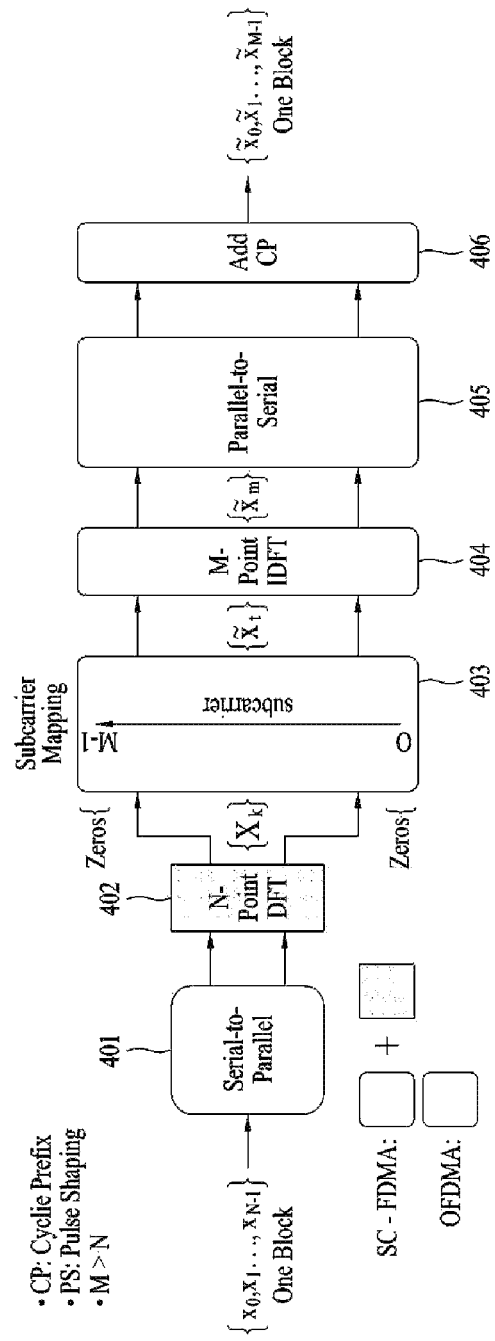

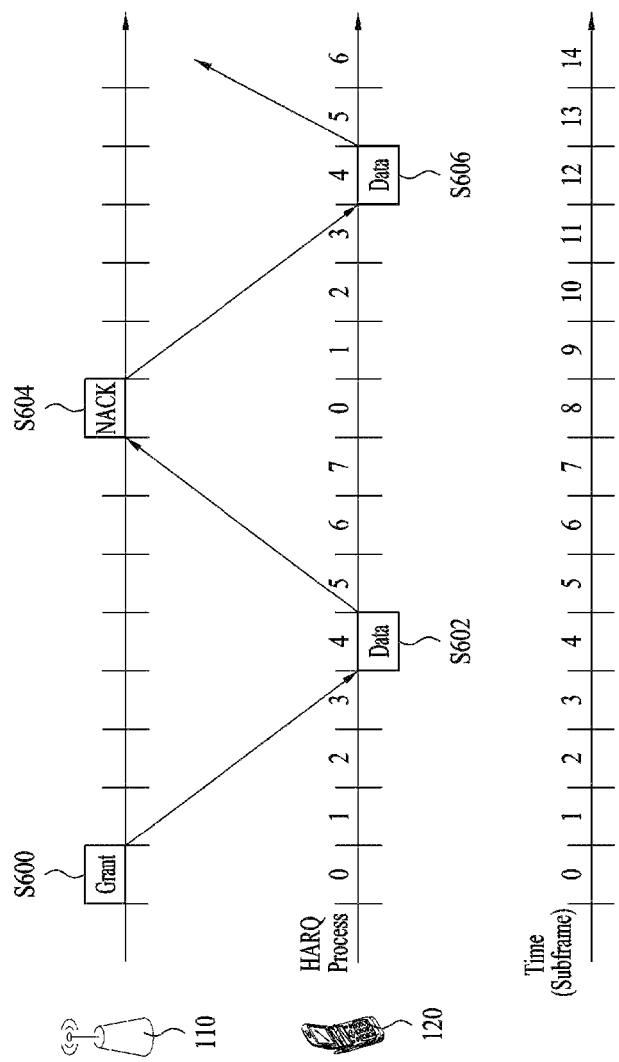
[FIG. 8]

[FIG. 9]
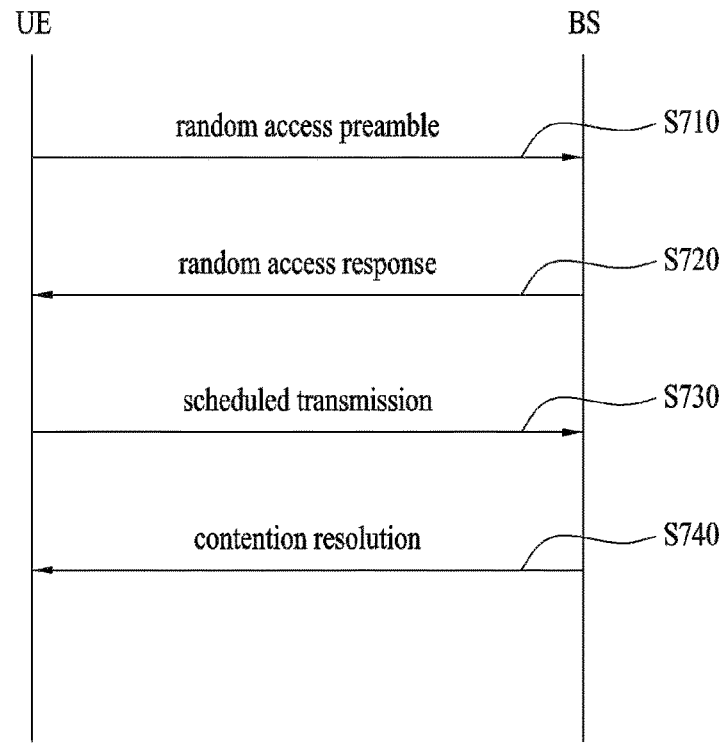
[FIG. 10]
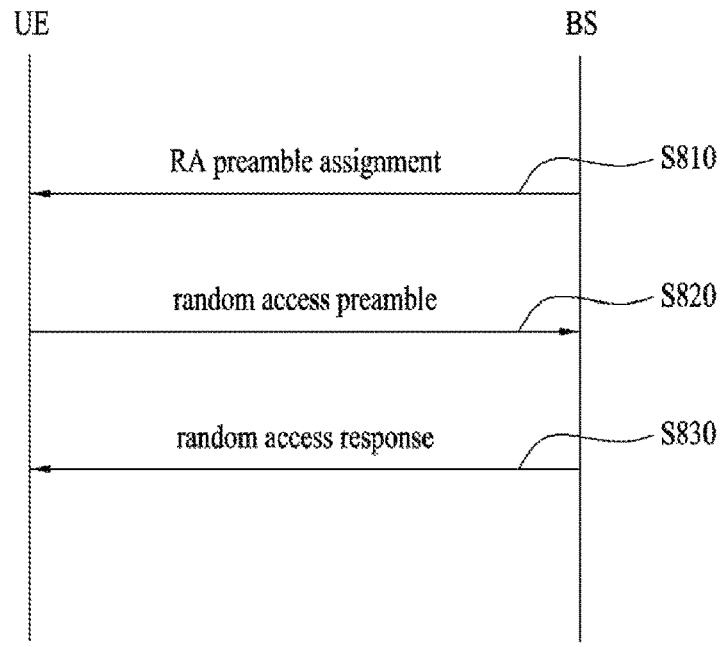

[FIG. 11]
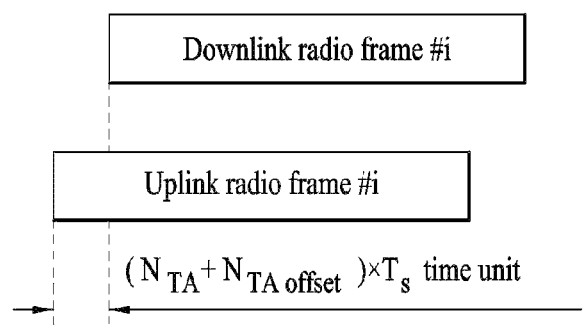

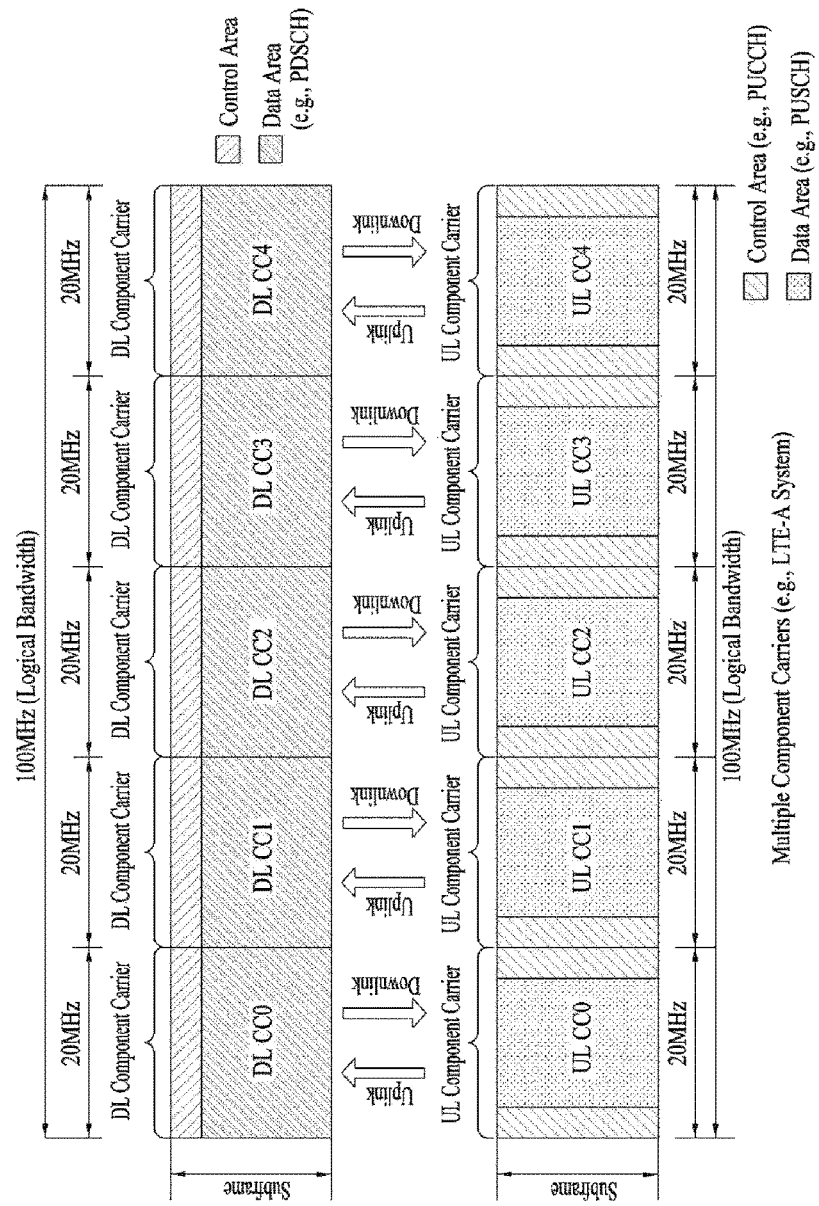
[FIG. 12]

【FIG. 13】
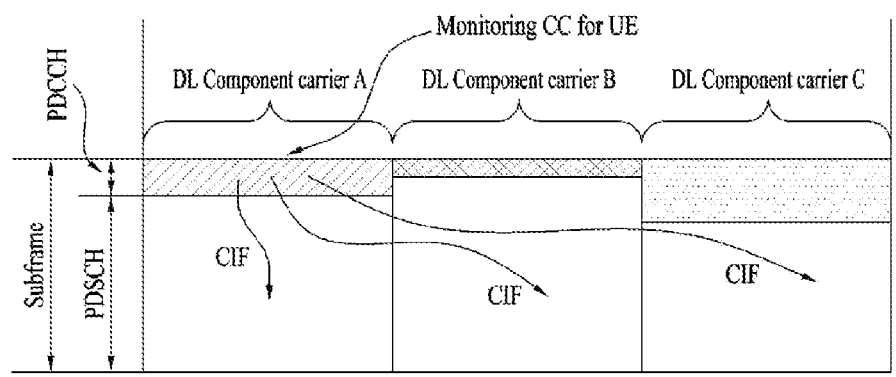
【FIG. 14】
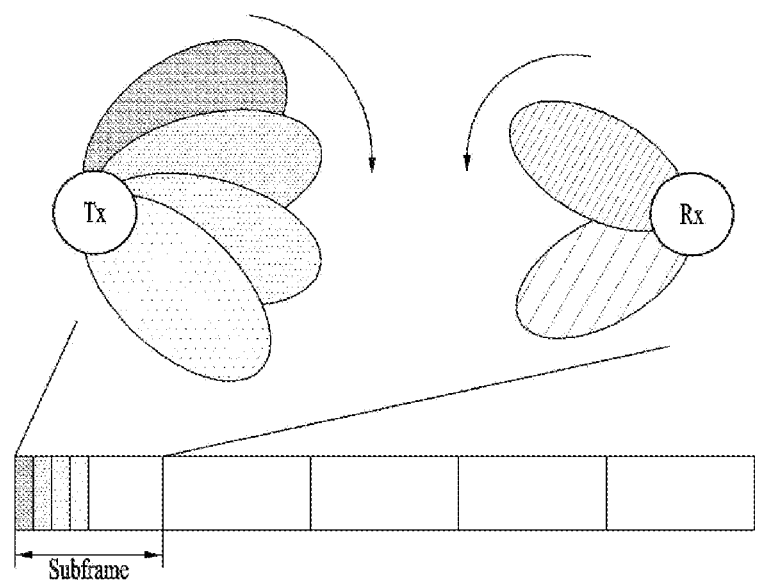

[FIG. 15]
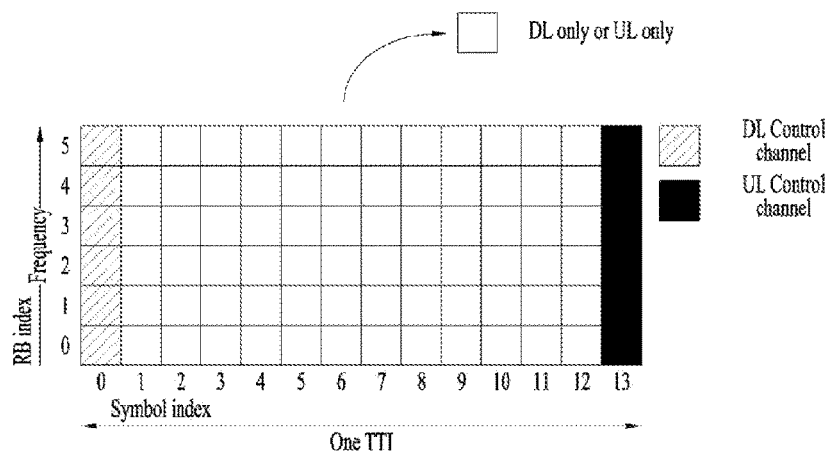
[FIG. 16]
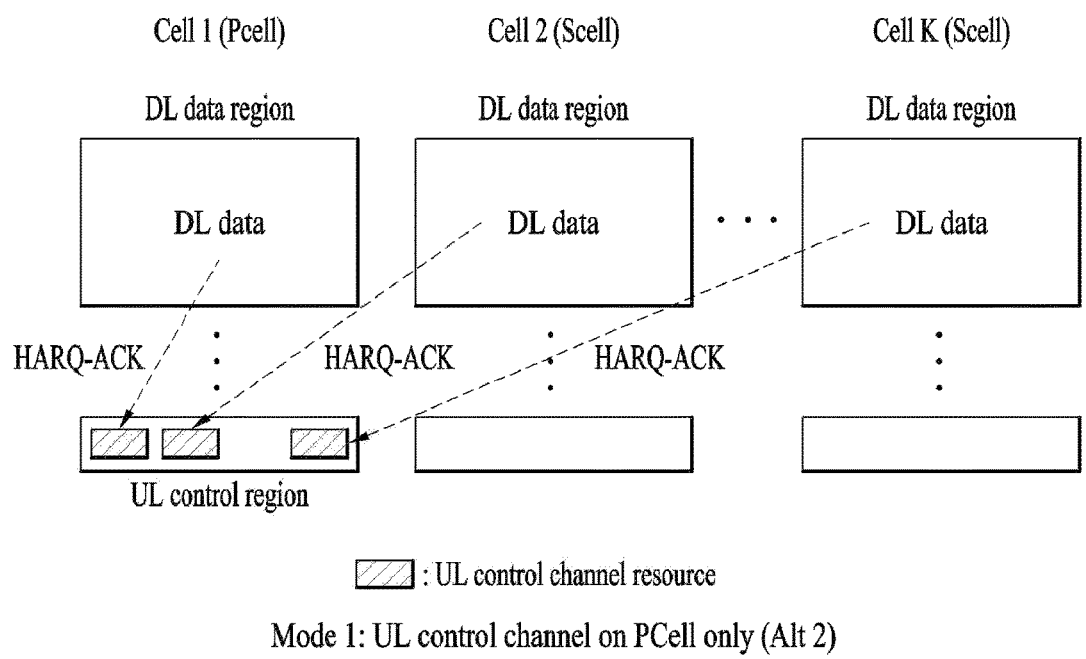
Mode 1: UL control channel on PCell only (Alt 2)

【FIG. 17】
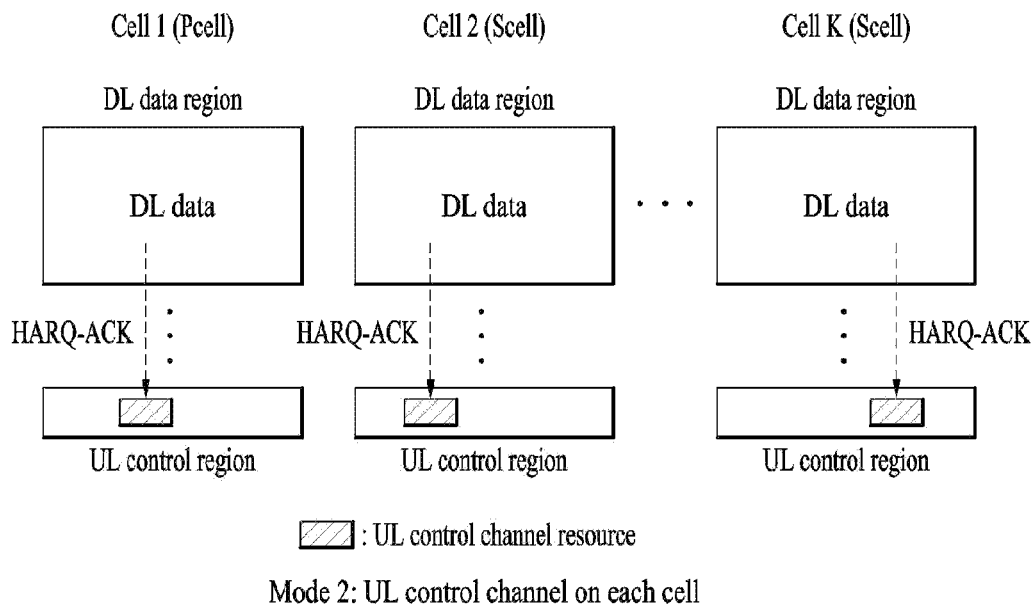
Mode 2: UL control channel on each cell
【FIG. 18】
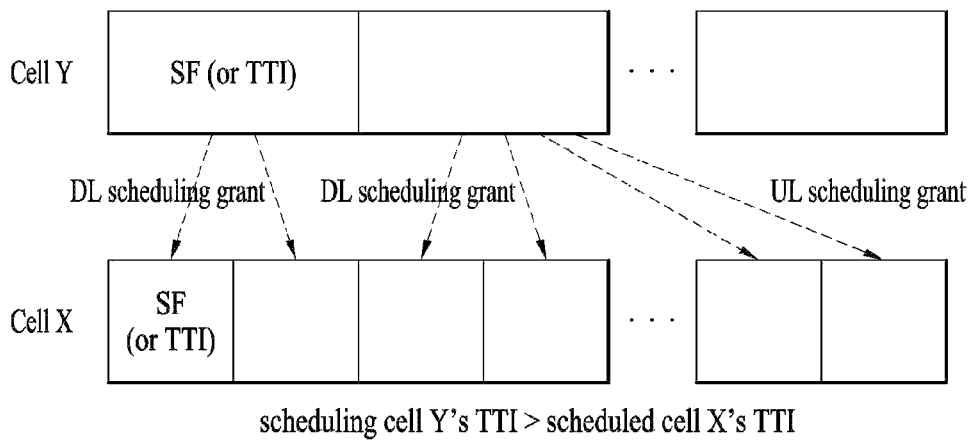
scheduling cell Y's TTI > scheduled cell X's TTI

[FIG. 19]
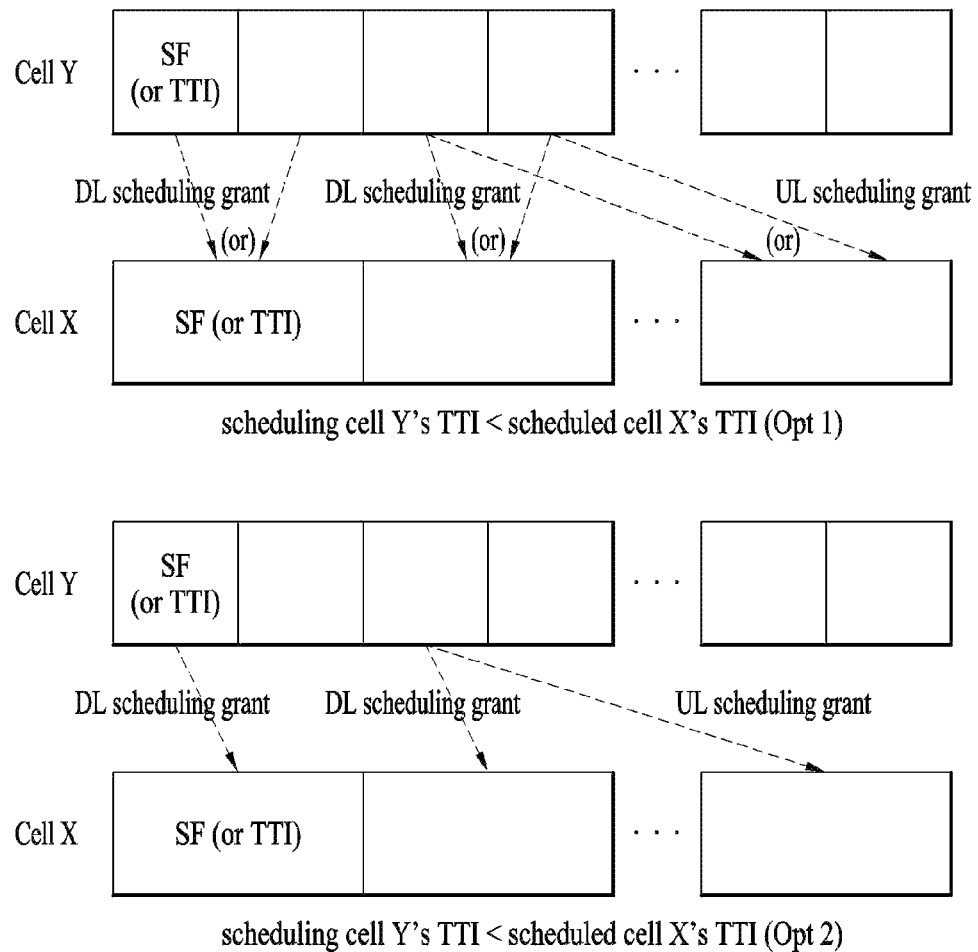
[FIG. 20]
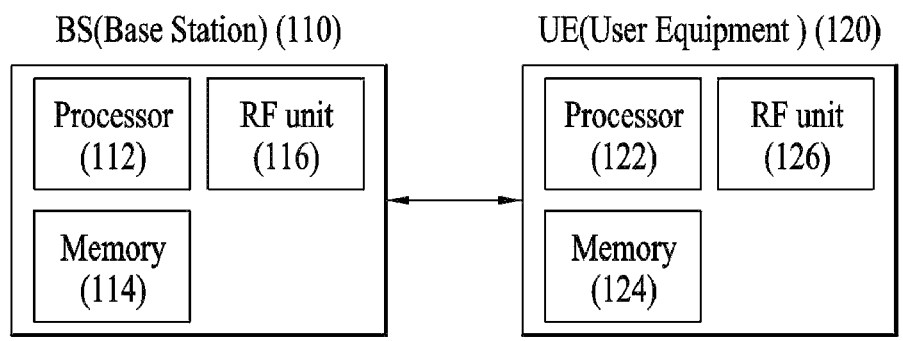

METHOD AND APPARATUS FOR TRANSMITTING AND RECEIVING WIRELESS SIGNAL IN WIRELESS COMMUNICATION SYSTEM

CROSS-REFERENCE TO RELATED APPLICATIONS

This application is a continuation of U.S. application Ser. No. 16/359,454, filed on Mar. 20, 2019, which is a continuation of U.S. application Ser. No. 16/065,429, filed on Dec. 13, 2018, no U.S. Pat. No. 11,018,838, which is a National Stage application under 35 U.S.C. § 371 of International Application No. PCT/KR2017/006284, filed on Jun. 15, 2017, which claims the benefit of U.S. Provisional Application No. 62/382,772, filed on Sep. 1, 2016, U.S. Provisional Application No. 62/372,327, filed on Aug. 9, 2016, and U.S. Provisional Application No. 62/350,204, filed on Jun. 15, 2016. The disclosures of the prior applications are incorporated by reference in their entirety.

TECHNICAL FIELD

The present invention relates to a wireless communication system, and more particularly, to a method and apparatus for transmitting/receiving a wireless signal. The wireless communication system includes a CA-based (Carrier Aggregation-based) wireless communication system.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

SUMMARY

An object of the present invention is to provide a method of efficiently transmitting/receiving control information in a wireless communication and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

To achieve these and other advantages and in accordance with the purpose of the present invention, as embodied and broadly described, according to one embodiment, a method of performing communication by a user equipment in a wireless communication, includes: aggregating a first cell having a first TTI (Transmission Timer Interval) length with a second cell having a second TTI length, wherein the second TTI length corresponds to N (N>1) multiple of the first TTI length, receiving data scheduling information for the second cell within a first TTI of the first cell, and performing data communication within a second TTI of the second cell corresponding to the first TTI of the first cell based on the data scheduling information. In this case, the first TTI of the first cell may correspond to one of the N TTIs of the first cell corresponding to the second TTI of the second cell.

To further achieve these and other advantages and in accordance with the purpose of the present invention, according to a different embodiment, a user equipment in a wireless communication system includes: an RF (Radio Frequency) module and a processor, the processor configured to aggregate a first cell having a first TTI (Transmission Timer Interval) length with a second cell having a second TTI length, wherein the second TTI length corresponds to N (N>1) multiple of the first TTI length, the processor configured to receive data scheduling information for the second cell within a first TTI of the first cell, the processor configured to perform data communication within a second TTI of the second cell corresponding to the first TTI of the first cell based on the data scheduling information. In this case, the first TTI of the first cell may correspond to one of the N TTIs of the first cell corresponding to the second TTI of the second cell.

Preferably, the N TTIs of the first cell corresponding to the second TTI of the second cell are divided into TTI groups and the first TTI of the first cell corresponds to a TTI belonging to a specific TTI group among the TTI groups.

Preferably, a position of a TTI corresponding to the first TTI of the first cell may vary over time in the specific TTI group.

Preferably, the first TTI of the first cell may correspond to a TTI overlapped with a first OFDM symbol in time domain among a plurality of OFDM (Orthogonal Frequency Division Multiplexing) symbols constructing the second TTI of the second cell among the N TTIs of the first cell corresponding to the second TTI of the second cell.

Preferably, the method can further include the step of sequentially monitoring the N TTIs of the first cell corresponding to the second TTI of the second cell to receive the data scheduling information for the second cell. In this case, if the data scheduling information for the second cell is detected, although there is a TTI to be monitored, monitoring on the N TTIs of the first cell can be terminated.

Preferably, a subcarrier spacing configured to the first cell may be greater than a subcarrier spacing configured to the second cell.

According to the present invention, wireless signal transmission and reception can be efficiently performed in a wireless communication system.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 1 illustrates physical channels used in 3GPP LTE(-A) and a signal transmission method using the same.

FIG. 2 illustrates a radio frame structure.

FIG. 3 illustrates a resource grid of a downlink slot.

FIG. 4 illustrates a downlink subframe structure.

FIG. 5 illustrates an example of an Enhanced Physical Downlink Control Channel (EPDCCH).

FIG. 6 illustrates the structure of an uplink subframe used in LTE(-A).

FIG. 7 illustrates Single Carrier Frequency Division Multiple Access (SC-FDMA) scheme and Orthogonal Frequency Division Multiple Access (OFDMA) scheme.

FIG. 8 illustrates UL HARQ (Uplink Hybrid Automatic Repeat reQuest) operation.

FIG. 9 and FIG. 10 illustrate examples of a random access procedure.

FIG. 11 illustrates uplink-downlink frame timing relation.

FIG. 12 illustrates a carrier aggregation (CA)-based wireless communication system.

FIG. 13 illustrates cross-carrier scheduling.

FIG. 14 illustrates analog beamforming.

FIG. 15 illustrates a structure of a self-contained subframe.

FIGS. 16 to 19 illustrate signal transmission according to the present invention.

FIG. 20 illustrates a base station and a user equipment applicable to an embodiment of the present invention.

DETAILED DESCRIPTION

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE. While the following description is given, centering on 3GPP LTE/LTE-A for clarity, this is purely exemplary and thus should not be construed as limiting the present invention.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

FIG. 2 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(*a*) illustrates a type-1 radio frame structure. A downlink subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Table 1 shows subframe configurations in a radio frame according to UL-DL configurations.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present invention is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared channel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries a HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. An arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4

QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 8 | 144 |
| 2 | 4 | 36 | 288 |
| 3 | 5 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Transmission Mode (TM)
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO (Multiple Input Multiple Output)
Transmission mode 6: Closed-loop rank-1 precoding
Transmission mode 7: Single-antenna port (ports) transmission
Transmission mode 8: Double layer transmission (ports 7 and 8) or single-antenna port (port 7 or 8) transmission
Transmission mode 9: Transmission through up to 8 layers (ports 7 to 14) or single-antenna port (port 7 or 8) transmission DCI Format
Format 0: Resource grants for PUSCH transmission
Format 1: Resource assignments for single codeword PDSCH transmission (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments FIG. 5 illustrates an EPDCCH. The EPDCCH is a channel additionally introduced in LTE-A.

Referring to FIG. 5, a PDCCH (for convenience, legacy PDCCH or L-PDCCH) according to legacy LTE may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similarly to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type.

In this specification, the PDCCH includes both L-PDCCH and EPDCCH unless otherwise noted.

FIG. 6 illustrates a structure of an uplink subframe used in LTE(-A).

Referring to FIG. 6, a subframe 500 is composed of two 0.5 ms slots 501. Assuming a length of a normal cyclic prefix (CP), each slot is composed of 7 symbols 502 and one symbol corresponds to one SC-FDMA symbol. A resource block (RB) 503 is a resource allocation unit corresponding to 12 subcarriers in the frequency domain and one slot in the time domain. The structure of the uplink subframe of LTE(-A) is largely divided into a data region 504 and a control region 505. A data region refers to a communication resource used for transmission of data such as voice, a packet, etc. transmitted to each UE and includes a physical uplink shared channel (PUSCH). A control region refers to a communication resource for transmission of an uplink control signal, for example, downlink channel quality report from each UE, reception ACK/NACK for a downlink signal, uplink scheduling request, etc. and includes a physical uplink control channel (PUCCH). A sounding reference signal (SRS) is transmitted through an SC-FDMA symbol that is lastly positioned in the time axis in one subframe. SRSs of a plurality of UEs, which are transmitted to the last SC-FDMAs of the same subframe, can be differentiated according to frequency positions/sequences. The SRS is used to transmit an uplink channel state to an eNB and is periodically transmitted according to a subframe period/offset set by a higher layer (e.g., RRC layer) or aperiodically transmitted at the request of the eNB.

FIG. 7 illustrates SC-FDMA and OFDMA schemes. The 3GPP system employs OFDMA in downlink and uses SC-FDMA in uplink.

Referring to FIG. 7, both a UE for transmitting an uplink signal and a BS for transmitting a downlink signal include a serial-to-parallel converter 401, a subcarrier mapper 403, an M-point IDFT module 404, and a cyclic prefix (CP) adder 406. The UE for transmitting a signal according to SC-FDMA additionally includes an N-point DFT module 402.

Next, HARQ (Hybrid Automatic Repeat reQuest) will be described. When there are a plurality of UEs having data to be transmitted on uplink/downlink in a wireless communication, an eNB selects UEs which will transmit data per transmission time internal (TTI) (e.g., subframe). In a system using multiple carriers and the like, an eNB selects UEs which will transmit data on uplink/downlink per TTI and also selects a frequency band to be used for data transmission of the corresponding UEs.

When description is based on uplink (UL), UEs transmit reference signals (or pilot signals) on uplink and an eNB detects channel states of the UEs using the reference signals transmitted from the UEs and selects UEs which will transmit data on uplink in each unit frequency band per TTI. The eNB notifies the UEs of the result of selection. That is, the eNB transmits, to UL scheduled UEs, a UL assignment message indicating that the UEs may transmit data using a specific frequency band in a specific TTI. The UL assignment message is also referred to as a UL grant. The UEs transmit data on uplink according to the UL assignment message. The UL assignment message may include UE identity (ID), RB allocation information, a modulation and coding scheme (MCS), a redundancy version (RV), new data indication (NDI) and the like.

In the case of synchronous HARQ, a retransmission time is appointed in the system (e.g., after 4 subframes from a NACK reception time) (synchronous HARQ). Accordingly, the eNB may send a UL grant message to UEs only in initial transmission and subsequent retransmission is performed according to an ACK/NACK signal (e.g., PHICH signal). In the case of asynchronous HARQ, a retransmission time is not appointed and thus the eNB needs to send a retransmission request message to UEs. Further, frequency resources or an MCS for retransmission are identical to those in previous transmission in the case of non-adaptive HARQ, whereas frequency resources or an MCS for retransmission may differ from those in previous transmission in the case of adaptive HARQ. For example, in the case of asynchronous adaptive HARQ, the retransmission request message may include UE ID, RB allocation information, HARQ process ID/number, RV and NDI information because frequency resources or an MCS for retransmission vary with transmission time.

FIG. 8 illustrates a UL HARQ operation in an LTE(-A) system. In the LTE(-A) system, asynchronous adaptive HARQ is used as UL HARQ. When 8-channel HARQ is used, 0 to 7 are provided as HARQ process numbers. One HARQ process operates per TTI (e.g., subframe). Referring to FIG. 8, a UL grant is transmitted to a UE 120 through a PDCCH (S600). The UE 120 transmits UL data to an eNB 110 after 4 subframes from the time (e.g., subframe 0) at which the UL grant is received using an RB and an MCS designated by the UL grant (S602). The eNB 110 decodes the UL data received from the UE 120 and then generates ACK/NACK. When decoding of the UL data fails, the eNB 110 transmits NACK to the UE 120 (S604). The UE 120 retransmits the UL data after 4 subframes from the time at which NACK is received (S606). Initial transmission and retransmission of the UL data are performed through the same HARQ process (e.g., HARQ process 4). ACK/NACK information may be transmitted through a PHICH.

Scheduling for UL transmission in LTE is enabled only if UL transmission timing of a user equipment is synchronized. A random access procedure is used for various usages. For instance, a random access procedure is performed in case of an initial network access, a handover, a data occurrence or the like. A user equipment may be able to obtain UL synchronization via the random access procedure. Once the UL synchronization is obtained, a base station may be able to allocate a resource for UL transmission to the corresponding user equipment. The random access procedure may be classified into a contention based procedure and a non-contention based procedure.

FIG. 9 is a diagram for one example of a contention based random access procedure.

Referring to FIG. 9, a user equipment receives information on a random access from a base station via system information. Thereafter, if the random access is required, the user equipment transmits a random access preamble (or a message 1) to the base station [S710]. Once the base station receives the random access preamble from the user equipment, the base station sends a random access response message (or, a message 2) to the user equipment [S720]. In particular, a DL scheduling information on the random access response message may be transmitted on L1/L2 control channel (PDCCH) by being CRC masked with RA-RNTI (random access-RNTI). Having received the RA-RNTI masked DL scheduling signal, the user equipment receives the random access response message on PDSCH and may be then able to decode the received random access response message. Subsequently, the user equipment checks whether a random access response information indicated to the user equipment is included in the received random access response message. In doing so, a presence or non-presence of the random access response information indicated to the user equipment may be checked in a manner of checking whether RAID (random access preamble ID) for the preamble having transmitted by the user equipment is present or not. The random access response information may include a timing advance indicating a timing offset information for synchronization, a radio resource allocation information on a resource used in UL, a temporary identifier (e.g., T-RNTI) for user equipment (UE) identification and the like. Once the random access response information is received, the user equipment sends a UL message (or, a message 3) on UL SCH (uplink shared channel) in accordance with the radio resource allocation information included in the received random access response information [S730]. Having received the UL message from the user equipment in the step S730, the base station sends a contention resolution message (or, a message 4) to the user equipment [S740].

FIG. 10 is a diagram for one example of a non-contention based random access procedure. A non-contention based random access procedure may be used in a handover procedure or may exist if requested by an order given by a base station. A basic procedure is as good as a contention based random access procedure.

Referring to FIG. 10, a user equipment receives assignment of a random access preamble (i.e., a dedicated random access preamble) for the user equipment only from a base station [S810]. A dedicated random access preamble indication information (e.g., a preamble index) may be included in a handover command message or may be received on PDCCH. The user equipment transmits the dedicated random access preamble to the base station [S820]. Thereafter, the user equipment receives a random access response from the base station [S830] and the random access procedure is ended.

In order to indicate a non-contention based random access procedure with a PDCCH order, DCI format 1A is used. And, the DCI format 1A may be used for compact scheduling for one PDSCH codeword. The following information is transmitted using the DCI format 1A.

Flag for identifying DCI format 0 or DCI format 1A: This flag is 1-bit flag. A flag value '0' indicates DCI format 0 and a flag value '1' indicates DCI format 1A.

If all the fields remaining after scrambling CRC of DCI format 1A with C-RNTI are set as follows, the DCI format 1A may be used for a random access procedure according to a PDCCH order.

Localized/distributed VRB (virtual resource block) assignment flag: This flag is 1-bit flag. This flag is set to 0.

Resource block assignment information: $\lceil \log_2(N_{RB}^{DL}(N_{RB}^{DL}+1)/2) \rceil$. Every bit is set to 1.

Preamble index: 6 bits

PRACH mask index: 4 bits

All the remaining bits for compact scheduling of PDSCH in DCI format 1A are set to 0.

FIG. 11 illustrates uplink-downlink frame timing relation.

Referring to FIG. 11, transmission of the uplink radio frame number i starts prior to $(N_{TA}+N_{TAoffset})*T_s$ seconds from the start of the corresponding downlink radio frame. In case of the LTE system, $0 \leq N_{TA} \leq 20512$, $N_{TAoffset}=0$ in FDD, and $N_{TAoffset}=624$ in TDD. The value $N_{Taoffset}$ is a value in advance recognized by the BS and the UE. If $N_{TA}$ is indicated through a timing advance command during a random access procedure, the UE adjusts transmission timing of UL signal (e.g., PUCCH/PUSCH/SRS) through the above equation. UL transmission timing is set to multiples of $16 T_s$. The timing advance command indicates the change of the UL timing based on the current UL timing. The timing advance command $T_A$ within the random access response is a 11-bit timing advance command, and indicates values of 0, 1, 2, . . . , 1282 and a timing adjustment value is given by $N_{TA}=T_A*16$. In other cases, the timing advance command TA is a 6-bit timing advance command, and indicates values of 0, 1, 2, . . . , 63 and a timing adjustment value is given by $N_{TA,new}=N_{TA,old}+(T_A-31)*16$. The timing advance command received at subframe n is applied from the beginning of subframe n+6. In case of FDD, as shown, transmitting timing of UL subframe n is advanced based on the start time of the DL subframe n. On the contrary, in case of TDD, transmitting timing of UL subframe n is advanced based on the end time of the DL subframe n+1 (not shown).

FIG. 12 illustrates carrier aggregation (CA) communication system.

Referring to FIG. 12, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC may be referred to as a primary CC and other CCs may be referred to as secondary CCs. For example, when cross-carrier scheduling (or cross-CC scheduling) is applied, a PDCCH for downlink allocation can be transmitted on DL CC #0 and a PDSCH corresponding thereto can be transmitted on DL CC #2. The term "component carrier" may be replaced by other equivalent terms (e.g. "carrier", "cell", etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.

No CIF

CIF enabled: a PDCCH on a DL CC can be used to allocate a PDSCH or PUSCH resource on a specific DL/UL CC from among a plurality of aggregated DL/UL CCs using the CIF.

LTE DCI format extended to have CIF

CIF corresponds to a fixed x-bit field (e.g. x=3) (when CIF is set)

CIF position is fixed irrespective of DIC format size (when CIF is set)

When the CIF is present, the BS may allocate a monitoring DL CC (set) to reduce BD complexity of the UE. For PDSCH/PUSCH scheduling, the UE may detect/decode a PDCCH only on the corresponding DL CCs. The BS may transmit the PDCCH only through the monitoring DL CC (set). The monitoring DL CC set may be set UE-specifically, UE-group-specifically or cell-specifically.

FIG. 13 illustrates scheduling when a plurality of carriers is aggregated. It is assumed that 3 DL CCs are aggregated and DL CC A is set to a PDCCH CC. DL CC A~C may be referred to as a serving CC, serving carrier, serving cell, etc. When the CIF is disabled, each DL CC can transmit only a PDCCH that schedules a PDSCH corresponding to the DL CC without a CIF according to LTE PDCCH rule (non-cross-CC scheduling). When the CIF is enabled through UE-specific (or UE-group-specific or cell-specific) higher layer signaling, a specific CC (e.g. DL CC A) can transmit not only the PDCCH that schedules the PDSCH of DL CC A but also PDCCHs that schedule PDSCHs of other DL CCs using the CIF (cross-scheduling). A PDCCH is not transmitted on DL CC B and DL CC C.

Furthermore, in a millimeter wave (mmW) system, a wavelength of a signal is short, so that a multitude of antennas can be installed in the same area. For example, since the wavelength is 1 cm in a 30 GHz band, a total of 100 antenna elements can be installed in a 5-by-5 cm² panel in a form of a two-dimensional array with a 0.5λ (wavelength) spacing. Therefore, in the mmW system, a plurality of antenna elements are used to increase a beamforming (BF) gain to increase a coverage or increase a throughput.

In this connection, when each antenna element has a TXRU (transceiver unit) so that transmission power and phase can be adjusted for each antenna element, independent beamforming may be realized for each frequency resource. However, installing each TXRU in each of all 100 antenna elements is ineffective in terms of cost. Therefore, a scheme of mapping a plurality of antenna elements to one TXRU and adjusting a direction of the beam with an analog phase shifter is considered. This analog beamforming scheme may form only one beam direction in a full band, and has a disadvantage that a frequency selective beam cannot be achieved. Thus, as an intermediate form between digital BF and analog BF, a hybrid BF in which B TXRUs map to Q antenna elements (B<Q) may be considered. In this case, a number of directions of a beam in which the beam is simultaneously transmitted is limited to a number smaller than or equal to B, though it varies depending on a connection scheme between the B TXRUs and Q antenna elements.

FIG. 14 illustrates analog beamforming. Referring to FIG. 14, a transmitter may transmit a signal while changing a direction of the beam over time (transmit beamforming). A receiver may also receive a signal while changing a direction of the beam over time (receive beamforming). Within a certain time interval, (i) directions of the transmit and receive beams may change simultaneously over time, (ii) a direction of the transmit beam may be fixed over time, while only a direction of the receive beam may change over time, or (iii) a direction of the receive beam may be fixed over time, while only a direction of the transmit beam may change over time.

In next-generation RAT (Radio Access Technology), a self-contained subframe is considered in order to minimize data transmission latency. FIG. 15 illustrates a self-contained subframe structure. In FIG. 15, a hatched region represents a DL control region and a black region represents a UL control region. A blank region may be used for DL data transmission or UL data transmission. DL transmission and UL transmission are sequentially performed in a single subframe, and thus DL data can be transmitted and UL ACK/NACK can also be received in a subframe. Consequently, a time taken until data retransmission is performed when a data transmission error is generated is reduced and thus final data delivery latency can be minimized.

As examples of self-contained subframe types which can be configured/set, the following four subframe types can be considered. Respective periods are arranged in a time sequence.

DL control period+DL data period+GP (Guard Period)+ UL control period
    DL control period+DL data period
    DL control period+GP+UL data period+UL control period
    DL control period+GP+UL data period A PDFICH, a PHICH and a PDCCH can be transmitted in the data control period and a PDSCH can be transmitted in the DL data period. A PUCCH can be transmitted in the UL control period and a PUSCH can be transmitted in the UL data period. The GP provides a time gap in a process in which a BS and a UE switch from a transmission mode to a reception mode or in a process in which the BS and the UE switch from the reception mode to the transmission mode. Some OFDM symbols in a subframe at a time when DL switches to UL may be set to the GP.

Embodiment

In New RAT (NR) system environment, when CA is performed on a plurality of cells for a single UE, OFDM numerology (e.g., subcarrier spacing and OFDM symbol period based on the subcarrier spacing) and a beamforming operation (e.g., TX/RX (analog or hybrid beamforming) to be applied and beam tracking) can be differently configured used based on a cell (group). In the abovementioned CA situation, it is necessary to consider a HARQ operation related to DL/UL data scheduling/transmission, a power control scheme in UL, a beam-related information signaling method, a UE-common signal transmission mechanism, and the like.

[1] Method of Transmitting UL Control Channel on which UCI is Carried

In NR system environment, a UE capable of performing a UL CA operation and a UE incapable of performing the UL CA operation may coexist depending on implementation and capability of a UE. Although a UE is able to perform a UL CA operation, UL transmission performance of the UE performed via a plurality of cells can be degraded due to such a factor as UL coverage, power limitation, and the like. It may consider two UL control channel (on which UCI is carried) transmission modes in CA situation in consideration of the factors. Specifically, 1) a UE can transmit a UL control channel through a specific cell (e.g., PCell) only or 2) a UE can be configured to individually transmit a UL control channel according to a cell. For clarity, although HARQ-ACK (i.e., A/N), which is transmitted in response to received DL data, is mainly explained, the same principle can also be applied to different UCI such as CSI, SR, and the like.

(a) Mode 1: UL Control Channel on PCell Only

In the mode 1, it is able to transmit a plurality of A/N feedbacks ("multi-cell A/N") via a specific cell (e.g., PCell) only in response to DL data received in a plurality of cells. Alt 1) the multi-cell A/N can be configured to be transmitted via a single UL control channel resource only or Alt 2) the multi-cell A/N can be configured to be transmitted via a plurality of UL control channel resources. In case of the Alt 2, a) it may be able to configure each of a plurality of the UL control channel resources to transmit A/N in response to data received in a cell only or b) it may be able to configure each of a plurality of the UL control channel resources to transmit one or more A/N in response to DL data received through a cell group (corresponding to a part of the entire cell groups) including one or more cells. In particular, a UL control channel resource for transmitting A/N can be differently configured/allocated according to a cell (a) or a cell group (b). Hence, (in case of considering an operation of indicating information on a UL control channel resource carrying A/N), it may indicate different UL control channel resource to a cell (a) or a cell group (b) via a DL grant that performs DL data scheduling.

Meanwhile, in case of transmitting a plurality of CSI feedbacks ("multi-cell CSI") on DL radio channels of a plurality of cells, it is able to configure a plurality of the CSI feedbacks to be transmitted via a specific cell (e.g., PCell) only. Alt 1) the multi-cell CSI can be configured to be transmitted via a single UL control channel resource only or Alt2) the multi-cell CSI can be configured to be transmitted via a plurality of UL control channel resources. In case of the Alt 2, a) it may be able to configure each of a plurality of the UL control channel resources to transmit single CSI only for a cell or b) it may be able to configure each of a plurality of the UL control channel resources to transmit one or more CSI for a cell group (corresponding to a part of the entire cell groups) including one or more cells. In particular, a UL control channel resource for transmitting CSI can be differently configured/allocated according to a cell (a) or a cell group (b). Meanwhile, it may be able to configure an SR to be transmitted via a single UL control channel resource or a plurality of UL control channel resources. Specifically, it may consider a method of transmitting a quantized BSR (buffer status report) in a form of multi-bit via a single UL control channel resource or a plurality of UL control channel resources by quantizing a UL buffer status of a UE using multiple bits.

(B) Mode 2: UL Control Channel on Each Cell

In the mode 2, it may be able to configure A/N (and/or CSI) feedback to be transmitted via a cell itself in response to DL data received in the cell.

It may be able to semi-statically indicate a mode for performing UL control channel transmission among the mode 1 and the mode 2 (and/or a scheme for performing UL control channel transmission among the Alt 1 and the Alt 2) via higher layer signaling (e.g., RRC signaling). Or, it may be able to dynamically indicate a mode for performing UL control channel transmission among the mode 1 and the mode 2 via L1 signaling (e.g., DL control channel transmission). And, whether or not the mode 2-based UL control channel transmission operation (and/or the Alt 2-based UL control channel transmission operation of the mode 1) is available may become UE capability which varies according to UE implementation. A UE can report information on the capability to an eNB at appropriate timing (e.g., initial access or RRC connection stage).

Meanwhile, it may be able to set the same UL control channel transmission mode (or, Alt schemes in the mode 1) to different UCI (e.g., A.N and CSI). Or, it may be able to independently (differently) configure a UL control channel transmission mode (or, Alt schemes in the mode 1) according to UCI.

FIG. 16 illustrates a UCI transmission procedure according to the mode 1 and FIG. 17 illustrates a UCI transmission procedure according to the mode 2. Referring to FIG. 16, a UE receives multiple DL data from multiple cells and is able to transmit a plurality of A/N feedbacks ("multi-cell A/N") via a specific cell (e.g., PCell) only in response to DL data received in a plurality of cells. Alt 1) the multi-cell A/N can be configured to be transmitted via a single UL control channel resource only or Alt 2) the multi-cell A/N can be configured to be transmitted via a plurality of UL control channel resources. FIG. 16 illustrates a procedure of transmitting multi-cell A/N according to the Alt 2. Referring to FIG. 17, a UE receives multiple DL data from multiple cells and is able to transmit A/N (and/or CSI) feedback via a cell itself in response to DL data received in the cell.

[2] CA Scheme Between Different OFDM Numerologies

In NR system environment, it may be able to differently configure OFDM numerology (e.g., subcarrier spacing and OFDM symbol (i.e., OS) duration based on the subcarrier spacing) among a plurality of cells carrier aggregated on a single UE. Hence, in the aspect of a single UE, (absolute time) duration of an SF or a TTI (for clarity, commonly referred to as SF) can be differently configured between aggregated cells. In consideration of this, in a CA situation between cells having a different SCS and OS duration, it may consider an operation method described in the following for a DL/UL data-related HARQ procedure (e.g., when DL/UL data transmission in an SCell is cross-CC scheduled from a PCell, A/N feedback is transmitted via the PCell in response to DL data received in the SCell.) In a CA situation between cells having the same SCS and OS duration, although duration of an SF or a TTI is differently configured between the cells, the same principle can be applied.

(A) Cross-CC Scheduling Between Different SCS

FIG. 18 illustrates a case that a cell X having a big SCS (i.e., short OS duration or short SF duration) is configured to be scheduled by a cell Y having a small SCS (i.e., long OS duration or long SF duration). Referring to FIG. 18, DL/UL data transmission in the K (K>1) SFs of the cell X can be configured to be scheduled by one SF of the cell Y. In this case, a single SF of the cell Y and the K SFs of the cell X may have the same time duration. Specifically, Opt 1) when a DL/UL grant for scheduling the (maximum) K SFs of the cell X is transmitted/detected at the same time via a DL control channel transmission region (within a single SF) of the cell Y or Opt 2) when the K DL control channel transmission regions within a single SF of the cell Y is independently configured, it is able to transmit/detect a DL/UL grant for scheduling a different SF in the cell X via each region.

FIG. 19 illustrates a case that a cell X having a small SCS (i.e., long OS duration or long SF duration) is configured to be scheduled by a cell Y having a big SCS (i.e., short OS duration or short SF duration). Referring to FIG. 19, DL/UL data transmission in a single SF of the cell X can be configured to be scheduled by all or a part (e.g., 1 SF) of the N (N>1) SFs of the cell Y. In this case, the N SFs of the cell Y and a single SF of the cell X may have the same time duration. Specifically, Opt 1) a DL/UL grant for scheduling a single SF of the cell X is transmitted/detected via an SF belonging to a plurality of SFs (i.e., SF group) corresponding to all or a part of the N SFs of the cell Y (FIG. 19 (*a*)), or Opt 2) a DL/UL grant for scheduling an SF of the cell X can be transmitted/detected via a specific SF (e.g., an SF of the cell Y overlapped with a first OS within an SF of the cell X over time) among the N SFs of the cell Y (FIG. 19 (*b*)). Meanwhile, in case of the Opt 1, SF timing at which a DL/UL grant is transmitted within an SF group may vary and each of a DL grant and a UL grant can be transmitted via a different SF within an SF group. Hence, a UE can sequentially perform a blind decoding operation on DL control channel transmission regions of all SFs belonging to an SF group of the cell Y. If all DL/UL grants for the cell X are detected within an SF group of the cell Y, the UE may not perform the blind decoding operation on DL control channel transmission regions within the remaining SFs.

(B) HARQ-ACK Timing for CA with Different SCS

In the CA situation of NR system, SCS or OS duration (or TTI length) can be differently configured between a cell (e.g., SCell) in which DL data is transmitted and a cell (e.g., PCell) in which A/N feedback is transmitted in response to the DL data. In this case, Opt 1) A/N timing (e.g., delay between DL data reception and A/N transmission) can be configured on the basis of a TTI length of the SCell in which the DL data is transmitted or Opt 2) the A/N timing can be configured on the basis of a TTI length of the PCell in which the A/N feedback is transmitted (e.g., A/N timing (candidate set) is configured by a multiple of the TTI length of the PCell). For clarity, the A/N timing configured according to the Opt 1/2 is referred to as 'temp A/N timing". In case of the Opt 1, actually applied actual A/N timing of the PCell can be determined by timing overlapped with timing appearing after the temp A/N timing (e.g., time corresponding to the N SCell TTIs) from the timing at which the DL data is received or a first TTI (or UL control channel transmission (for A/N)) duration of the PCell appearing after the temp A/N timing from the DL data reception timing of the SCell. Meanwhile, in case of the Opt 2, actually applied actual A/N timing of the PCell can be determined by timing overlapped with timing at which the DL data is received or a TTI (or UL control channel transmission (for A/N)) duration of the PCell appearing after the temp A/N timing (e.g., time corresponding to the M PCell TTIs) from the first TTI (or UL control channel transmission (for A/N)) duration of the PCell existing after the DL data reception timing of the SCell.

Meanwhile, in case of UL HARQ, SCS (e.g., first/second SCSs) or OS duration (or a TTI length) (e.g., first/second time units) can be differently configured between a cell (e.g., PCell) in which a UL grant is transmitted and a cell (e.g., SCell) in which UL data is transmitted in response to the UL grant. In this case, Opt 1) HARO timing (e.g., delay between UL grant reception and UL data transmission) can be configured on the basis of a TTI length of the SCell in which the UL grant is transmitted (e.g., HARO timing (candidate set) is configured by a multiple of a TTI length of the PCell) or Opt 2) the HARQ timing can be configured on the basis of a TTI length (e.g., a duration of a second time unit) of the SCell in which the UL data is transmitted (e.g., HARQ timing (candidate set) is configured by a multiple of a TTI length of the SCell). For convenience, the HARQ timing configured according to the Opt 1/2 is referred to as 'temp HARQ timing'. In case of the Opt 1, actually applied actual HARQ timing of the SCell can be determined as a timing overlapped with a timing after the tempHARQ timing (e.g., time corresponding to the K PCell TTIs) from a timing at which the UL grant is received on PCell, or an earliest TTI (or UL data channel transmission) duration of the SCell, including the timing overlapped, appearing thereafter. Meanwhile, in case of the Opt 2, actually applied actual HARQ timing (e.g., m-th second time unit) of the SCell can be determined as a TTI (or UL data channel transmission) duration after the temp HARQ timing (e.g., time corresponding to the L SCell TTIs) (e.g., timing offset delay) from a timing (e.g., k-th second time unit) overlapped with a timing (e.g., n-th first time unit) at which the UL grant is received on PCell or an earliest TTI (or UL data channel transmission) duration (e.g., k-th second time unit) of the SCell, including the timing overlapped, appearing thereafter.

(C) UL TA (Timing Advancement) Management Between Different SCS

When CA is performed between cells operating with a different SCS, if TA for matching UL synchronization is applied, since sample time and a CP length are also differentiated according to the different SCS, it is difficult or impossible to apply the same TA value between the cells operating with the different SCS. Hence, if a set of one or more cells to which the same TA value is applicable is defined as a TAG (Timing Advance Group), it may be able to configure only cells operating with the same SCS to belong to a TAG It may be able to configure cells operating with a different SCS not to belong to the same TAG In addition, it may be able to configure only cells operating with the same SCS and cells operating with the same CP length (a CP length difference between cells is equal to or less than a specific level) to belong to a TAG It may be able to configure cells operating with a different SCS or a different CP length (a CP length difference between cells exceeds a specific level) not to belong to the same TAG Or, it may be able to configure cells of which an SCS value difference between cells (and/or a CP length difference between cells) is equal to or less than a specific level to belong to a TAG In particular, it may be able to configure cells of which an SCS value difference between cells (and/or a CP length difference between cells) exceeds a specific level not to belong to the same TAG.

As a different method, in a state that there is no separate TAG configuration restriction, if cells operating with a different SCS are configured to belong to a TAG; it may be able to configure a random access signal for determining a TA value to be transmitted by a cell operating with a biggest SCS (i.e., smallest sample time and CP length) (or a cell configured by the biggest SCS of a random access signal) among the cells belonging to the TAG In addition, it may be able to configure a random access signal to be transmitted via a cell to which a smallest CP length is set only among the cells operating with the biggest SCS (or cells configured by the biggest SCS of a random access signal) within the same TAG When a cell group (UCIG) is configured to transmit a UL control channel (or UL data channel) carrying UCI (e.g., A/N, CSI) on a specific cell set (to which cells belong) via a specific (random) cell of the cell set only (i.e., a UL control channel carrying UCI on cells belonging to the UCIG is configured to be transmitted via a specific cell of the UCIG only), the UCIG (and a cell in which UL control channel (UCI) is transmitted) can be configured by applying a condition identical to the TAG (and a cell in which a random access signal is transmitted). And, when a cell group (DCIG) is configured to transmit a DL control channel carrying DCI (e.g., DL/UL scheduling grant) on a specific cell set (to which cells belong) via a specific cell of the cell set only (i.e., cross-CC scheduling is configured to be performed between cells belonging to the DCIG only), the DCIG can be configured by applying a condition identical to the TAG In particular, it is able to configure the DCIG (and a cell in which a DL control channel (DCI) is transmitted) by applying the condition identical to the TAG (and a cell in which a random access signal is transmitted).

[3] Analog Beam-Forming Considering CA Scheme

In case of an NR system operating on a specific frequency band (e.g., high carrier frequency), it is highly probable that the NR system performs TX/RX (analog or hybrid) beamforming on a DL/UL signal in an eNB (and/or a UE) based on mmW characteristic. As an example, the eNB transmits a plurality of specific (UE-common) signals (e.g., a synchronization signal or a reference signal) having different beam direction during a certain period and the UE reports reception quality/state information (i.e., BSI (beam state information)) and/or preferred beam information (e.g., beam ID or index) optimized to the UE of a received specific signal (i.e., beam direction) to the eNB. The UE can perform beamforming-based DL/UL signal transmission/reception operation based on the information. In this case, the beam ID (or index) may correspond to an index for identifying a beam (direction) formed by combination of antenna ports different from each other. Meanwhile, in case of an NR system operating on a specific frequency band (e.g. low carrier frequency), it is probable that the NR system operates as a legacy system without applying the abovementioned beamforming. In particular, in NR system environment, it may consider a case that CA is performed on a cell to which beamforming (BF) is applied (i.e., BF cell) and a cell to which beamforming is not applied (i.e., non-BF cell) at the same time in a UE.

(A) CA Between Non-BF Cell and BF Cell

When CA is performed between a non-BF cell and a BF cell, the non-BF cell may support relatively superior signal transmission reliability and coverage compared to the BF cell. Hence, in case of a specific (e.g., important) information type, it may be able to configure transmission to be performed by the non-BF cell (a UL data/control channel of the cell) only (by preferentially selecting a UL data/control channel of the non-BF cell (prior to the BF cell)). In this case, the specific information type can include at least one selected from the group consisting of a response message received from the eNB in response to RRC configuration, a response message received from the eNB in response to MAC command, various reports (e.g., power headroom report, buffer status report) using an (event-trigger and period scheme-based) MAC signal, and an RRM (Radio Resource Management) measurement-related report.

Meanwhile, it may be able to configure either non-BF cells or BF cells to belong to a single DCIG only. In particular, it may be able to configure a non-BF cell and a BF cell not to belong to the same DCIG Or, if a non-BF cell and a BF cell are configured to belong to a single DCIG without a separate DCIG configuration restriction, it may be able to configure a DL control channel (DCI) to be transmitted via a non-BF cell only. To this end, it may be able to configure at least one non-BF cell to belong to a DCIG Similarly, it may be able to configure either non-BF cells or BF cells to belong to a single UCIG only. In particular, it may be able to configure a non-BF cell and a BF cell not to belong to the same UCIG In this case, if a non-BF cell and a BF cell are configured to belong to a single UCIG without a separate UCIG configuration restriction, it may be able to configure a UL control channel (UCI) to be transmitted via a non-BF cell only. To this end, it may be able to configure at least one non-BF cell to belong to a UCIG Additionally, it may be able to configure either non-BF cells or BF cells to belong to a single TAG only. In particular, it may be able to configure a non-BF cell and a BF cell not to belong to the same TAG In this case, if a non-BF cell and a BF cell are configured to belong to a single TAG without a separate TAG configuration restriction, it may be able to configure a random access signal to be transmitted via a non-BF cell only. To this end, it may be able to configure at least one non-BF cell to belong to a TAG Meanwhile, the UE can transmit a signal for asking the eNB to change a beam ID, a signal for reporting a TX/RX beam mismatch state to the eNB, a signal for asking the eNB to allocate a UL resource for transmitting BSI or BRI (Beam Refinement Information) feedback on the BF cell, a signal for asking the eNB to transmit a DL RS for beam measurement/refinement as well as BSI feedback on the BF cell to the eNB via the non-BF cell (UL data/control channel of a corresponding cell) (for clarity, the abovementioned signals are referred to as "beam-related SR"). And, the UE can report a measurement result for a DL RS for beam measurement/refinement transmitted via the BF cell to the eNB via the non-BF cell. And, the UE can signal information on whether or not a DL control channel (e.g., a DL/UL grant signal scheduling a DL/UL data channel, etc.) is detected to the eNB via the non-BF cell. For example, the UE can signal information on whether or not a DL control channel is detected via the BF cell during specific duration or information on an amount of the DL control channels to the eNB via the non-BF cell. When the UE operates in the BF cell, the abovementioned operations are required because a mismatch may occur on a TX/RX beam according to a radio channel status and DL/UL signal transmission transmitted by the BF cell in the status is not stable.

Meanwhile, the abovementioned proposed operation may not be restricted to the CA between the non-BF cell and the BF cell. For example, the same operation can be applied in a state that the non-BF cell and the BF cell are replaced with a PCell and a SCell or a first cell and a second cell, respectively. More generally, the proposed operation can be applied in a state that the non-BF cell and the BF cell are regarded as a first cell and a second cell different from each other or a single cell.

(B) Activation/Deactivation of BF Cell

Unlike a legacy non-BF cell, in case of a BF cell, a (preferred) beam ID may change during a deactivation period due to a radio channel change, and the like. In consideration of this, a UE can configure the BF cell to perform BSI measurement and (preferred) beam search by receiving a specific signal (e.g., a synchronization signal or a reference signal) after the BF cell is activated (and report the BSI and the (preferred) beam ID to an eNB). Meanwhile, the UE may not perform a different DL/UL signal transmission/reception operation in the BF cell until the abovementioned operation is completed.

As a different method, it may be able to configure the UE to perform beam tracking (e.g. BSI measurement, (preferred) beam search) on the BF cell by receiving a specific signal (e.g., a synchronization signal or a reference signal) during the deactivation of the BF cell. Hence, the UE can report (recent) BSI and a (preferred) beam ID to the eNB while the BF cell is activated (via a response message in response to an activation message). Meanwhile, the eNB can trigger an RS for measuring BSI to be transmitted via an activation message for the BF cell and/or indicate the UE to report a BSI measurement result.

Meanwhile, the non-BF cell normally performs a UL/DL signal transmission/reception operation during an activation period and does not perform a UL/DL signal transmission/reception operation during a deactivation period. For example, the non-BF cell does not receive a DL physical channel (e.g., PDCCH, PHICH, etc.) during the deactivation period and does not perform a CSI/SRS transmission operation.

[4] UL Power Control in Various CA Situations

When CA is performed between cells operating with a different SCS (or different OS duration), if UE maximum power restriction (e.g., the sum of UL power (configured by an eNB) exceeds UE maximum power at the same timing) occurs, it may consider a method of preferentially reducing a UL channel/signal power (of a cell) configured by a small SCS (or long OS duration) and/or a method of assigning minimum guaranteed power to a UL channel/signal (of a cell) configured by a big SCS (or short OS duration). For example, if minimum guaranteed power for a specific UL channel/signal is defined by G-power and power configured by an eNB is defined by C-power, final power (i.e., S-power) of the specific UL channel/signal calculated by a power scaling procedure in the UE maximum power restriction can be determined by a value equal to or greater than min {G-power, C-power} only (i.e., a minimum value of the S-power is restricted to min {G-power, C-power}). Meanwhile, when CA is performed between a non-BF cell and a BF cell, if UE maximum power restriction occurs, it may consider a method of preferentially reducing UL channel/ signal power of the non-BF cell and/or a method of assigning G-power to a UL channel/signal of the BF cell.

Meanwhile, when UL channels/signals (e.g., UL data/ control channel, UL sounding signal) having the different number of symbols (or having different time duration) are transmitted at the same time, if UE maximum power restriction occurs, it may consider a method of preferentially reducing power of a UL channel/signal having more symbols (or longer time duration) and/or a method of assigning minimum guaranteed power to a UL channel/signal having less symbols (or shorter time duration). Meanwhile, when UL channels/signals (e.g., UL data/control channel, UL sounding signal) to which a different UL modulation scheme (e.g., OFDM or DFT-based SC-FDM) is applied are transmitted at the same time, it may consider a method of preferentially reducing power of a UL channel/signal to which the OFDM scheme is applied and/or a method of assigning minimum guaranteed power to a UL channel/ signal to which the SC-FDM scheme is applied.

The abovementioned proposed method can be applied in consideration of a power scaling priority (e.g., power is reduced in an order of random access signal>control channel>data channel>sounding signal) between UL channels/signals and a power scaling priority between UCI types (e.g., power is reduced in an order of A/N>SR>CSI, A/N=SR>CSI, or SR>A/N>CSI). For example, power scaling is performed according to the priority between UL channels/signals and the priority between UCI types after the proposed scheme is preferentially applied. Or, the proposed scheme is applied between channels/signals and UCI types having the same priority after the power scaling is performed according to the priority between UL channels/ signals and the priority between UCI types.

Meanwhile, it may be able to assign a power scaling priority higher than a priority of a different UCI type (e.g. A/N, CSI) to a beam-related SR (irrespective of whether or not CA is configured). For example, if UE maximum power restriction occurs, it may be able to preferentially reduce signal power of a different UCI type compared to a beam-related SR signal. Specifically, a power scaling priority (equal to or) lower than A/N is assigned to a general data SR requesting a UL data transmission resource. On the contrary, it may be able to assign a power scaling priority higher than A/N to a beam-related SR. As a different example, while a power scaling priority lower than a random access signal is assigned to a general data SR, it may be able to assign a power scaling priority higher than a random access signal to a beam-related SR. Meanwhile, a (contention-based) random access signal resource capable of being selected/transmitted by a UE in an initial access or an idle mode (to prevent excessive contention and congestion in a random access situation) and a (contention-based) random access signal resource capable of being selected/transmitted by a UE (to request scheduling) in a connected mode can be configured to be distinguished from each other in time/ frequency/code.

[5] Method of Performing CA Including Non-Standalone SCell

In NR system environment, a SCell configuring CA may operate in a form of standalone or non-standalone. In particular, when CA including a non-standalone SCell is performed, 1) an eNB can aperiodically trigger transmission of a specific (UE-common) signal (e.g., a synchronization signal, system information, or a reference signal) in the SCell and 2) a UE may aperiodically request the transmission of the specific signal. When (potential or candidate) timing and a period capable of transmitting the specific signal is configured in advance, if there is a transmission of a trigger signal of an eNB or a transmission of a request signal of a UE for the specific signal via random timing, it may consider a method of transmitting and receiving the triggered/requested specific signal via timing and a period closest from the timing at which the trigger/request signal is transmitted (or timing to which a specific time offset is added). In this case, the trigger signal of the eNB or the request signal of the UE for the specific signal can be transmitted via a cell (e.g., PCell) operating in a form of standalone.

Meanwhile, in case of a standalone cell, transmission of a specific (UE-common) signal (e.g., a synchronization signal, specific partial system information (except information necessary for performing initial access stage/procedure ((e.g. random access signal/resource configuration)), a reference signal, etc.) can be aperiodically triggered/requested by an eNB or a UE. In this case, the aforementioned proposed method can be identically applied. More generally, the proposed method is not restricted to CA between a standalone cell and a non-standalone cell. The same operation can be applied in a state that the standalone cell and the non-standalone cell are replaced with a PCell and a SCell or a first cell and a second cell, respectively. More generally, the proposed method can be applied in a state that the standalone cell and the non-standalone cell are regarded as a first cell and a second cell different from each other or a single cell.

Meanwhile, it may be able to configure either standalone cells (i.e., SA-cells) or non-standalone cells (i.e., NSA-cells) to belong to a single DCIG only. In particular, it may be able to configure an SA-cell and an NSA-cell not to belong to the same DCIG Or, if an SA-cell and an NSA-cell are configured to belong to a single DCIG without a separate DCIG configuration restriction, it may be able to configure a DL control channel (DCI) to be transmitted via an SA-cell only. To this end, it may be able to configure at least one SA-cell to belong to a DCIG Similarly, it may be able to configure either SA-cells or NSA-cells to belong to a single UCIG only. In particular, it may be able to configure an SA-cell and an NSA-cell not to belong to the same UCIG In this case, if an SA-cell and an NSA-cell are configured to belong to a single UCIG without a separate UCIG configuration restriction, it may be able to configure a UL control channel (UCI) to be transmitted via an SA-cell only. To this end, it may be able to configure at least one SA-cell cell to belong to a UCIG Additionally, it may be able to configure either SA-cells or NSA-cells to belong to a single TAG only. In particular, it may be able to configure an SA-cell and an NSA-cell not to belong to the same TAG In this case, if an SA-cell and an NSA-cell are configured to belong to a single TAG without a separate TAG configuration restriction, it may be able to configure a random access signal to be transmitted via an SA-cell only. To this end, it may be able to configure at least one SA-cell to belong to a TAG Meanwhile, when a single cell or a carrier is divided into a plurality of subbands and an SCS or a TTI of a different size is set to each of a plurality of the subbands, although a UE operates on a plurality of the subbands at the same time or switches between subbands, all of the proposed methods of the present invention can be similarly applied (in a manner of replacing a cell with a subband).

FIG. 20 illustrates a BS and a UE of a wireless communication system, which are applicable to embodiments of the present invention.

Referring to FIG. 20, the wireless communication system includes a BS 110 and a UE 120. When the wireless communication system includes a relay, the BS or UE may be replaced by the relay.

The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The present invention is applicable to UEs, eNBs or other apparatuses of a wireless mobile communication system.

What is claimed is:

1. A method of performing communication by a user equipment (UE) in a wireless communication system, the method comprising:
    receiving control information for scheduling a uplink data at an n-th first time unit among first time units of a first cell that each have a duration;
    determining an m-th second time unit among second time units of a second cell that each have a duration, wherein the second cell is associated with carrier indicator information of the control information, and the m-th second time unit of the second cell is determined based on timing offset information related to a timing offset delay for the UE; and
    based on the control information, transmitting the uplink data at the m-th second time unit of the second cell,
    wherein the m-th second time unit is determined to be the timing offset delay after a k-th second time unit which is related to receiving the control information, and
    wherein the duration of each of the first time units is larger than the duration of each of the second time units, and the k-th second time unit is an earliest one of a plurality of second time units of the second cell that overlap in time with the n-th first time unit of the first cell.

2. The method of claim 1, wherein the control information is received on a first frequency band related to the first cell, and
    wherein the uplink data is transmitted on a second frequency band related to the second cell.

3. The method of claim 1, wherein the control information comprises scheduling information, and
    wherein the uplink data is transmitted at the m-th second time unit based on the scheduling information that was received in the control information.

4. The method of claim 1, wherein the timing offset delay is represented in terms of the second time units.

5. The method of claim 1, wherein each of the first time units comprises a first plurality of orthogonal frequency division multiplexed (OFDM) symbols, and
    wherein each of the second time units comprises a second plurality of orthogonal frequency division multiplexed (OFDM) symbols.

6. A user equipment (UE) configured to perform communication in a wireless communication system, the UE comprising:
    at least one radio frequency (RF) module;
    at least one processor; and
    at least one computer memory operably connectable to the at least one processor and storing instructions that, when executed, cause the at least one processor to perform operations comprising:
    receiving control information for scheduling a uplink data at an n-th first time unit among first time units of a first cell that each have a duration;

determining an m-th second time unit among second time units of a second cell that each have a duration, wherein the second cell is associated with carrier indicator information of the control information, and the m-th second time unit of the second cell is determined based on timing offset information related to a timing offset delay for the UE; and based on the control information, transmitting the uplink data at the m-th second time unit of the second cell, wherein the m-th second time unit is determined to be the timing offset delay after a k-th second time unit which is related to receiving the control information, and wherein the duration of each of the first time units is larger than the duration of each of the second time units, and the k-th second time unit is an earliest one of a plurality of second time units of the second cell that overlap in time with the n-th first time unit of the first cell.

7. The UE of claim 6, wherein the control information is received on a first frequency band related to the first cell, and wherein the uplink data is transmitted on a second frequency band related to the second cell.

8. The UE of claim 6, wherein the control information comprises scheduling information, and wherein the Uplink data is transmitted at the m-th second time unit based on the scheduling information that was received in the control information.

9. The UE of claim 6, wherein the timing offset delay is represented in terms of the second time units.

10. The UE of claim 6, wherein each of the first time units comprises a first plurality of orthogonal frequency division multiplexed (OFDM) symbols, and wherein each of the second time units comprises a second plurality of orthogonal frequency division multiplexed (OFDM) symbols.

11. A method of performing communication by a base station (B S) in a wireless communication system, the method comprising:

transmitting control information for scheduling a uplink data at an n-th first time unit among first time units of a first cell that each have a duration;

determining an m-th second time unit among second time units of a second cell that each have a duration, wherein the second cell is associated with carrier indicator information of the control information, and the m-th second time unit of the second cell is determined based on timing offset information related to a timing offset delay; and based on the control information, receiving the uplink data at the m-th second time unit of the second cell, wherein the m-th second time unit is determined to be the timing offset delay after a k-th second time unit which is related to transmitting the control information, and wherein the duration of each of the first time units is larger than the duration of each of the second time units, and the k-th second time unit is an earliest one of a plurality of second time units of the second cell that overlap in time with the n-th first time unit of the first cell.

12. The method of claim 11, wherein the control information is transmitted on a first frequency band related to the first cell, and wherein the uplink data is received on a second frequency band related to the second cell.

13. The method of claim 11, wherein the control information comprises scheduling information, and wherein the Uplink data is received at the m-th second time unit based on the scheduling information that was transmitted in the control information.

14. The method of claim 11, wherein the timing offset delay is represented in terms of the second time units.

15. The method of claim 11, wherein each of the first time units comprises a first plurality of orthogonal frequency division multiplexed (OFDM) symbols, and wherein each of the second time units comprises a second plurality of orthogonal frequency division multiplexed (OFDM) symbols.

16. A base station (BS) configured to perform communication in a wireless communication system, the BS comprising:

at least one radio frequency (RF) module;

at least one processor; and at least one computer memory operably connectable to the at least one processor and storing instructions that, when executed, cause the at least one processor to perform operations comprising:

transmitting control information for scheduling a uplink data at an n-th first time unit among first time units of a first cell that each have a duration;

determining an m-th second time unit among second time units of a second cell that each have a duration, wherein the second cell is associated with carrier indicator information of the control information, and the m-th second time unit of the second cell is determined based on timing offset information related to a timing offset delay; and based on the control information, receiving the uplink data at the m-th second time unit of the second cell, wherein the m-th second time unit is determined to be the timing offset delay after a k-th second time unit which is related to transmitting the control information, and wherein the duration of each of the first time units is larger than the duration of each of the second time units, and the k-th second time unit is an earliest one of a plurality of second time units of the second cell that overlap in time with the n-th first time unit of the first cell.

17. The BS of claim 16, wherein the control information is transmitted on a first frequency band related to the first cell, and wherein the uplink data is received on a second frequency band related to the second cell.

18. The BS of claim 16, wherein the control information comprises scheduling information, and wherein the uplink data is received at the m-th second time unit based on the scheduling information that was transmitted in the control information.

19. The BS of claim 16, wherein the timing offset delay is represented in terms of the second time units.

20. The BS of claim 16, wherein each of the first time units comprises a first plurality of orthogonal frequency division multiplexed (OFDM) symbols, and wherein each of the second time units comprises a second plurality of orthogonal frequency division multiplexed (OFDM) symbols.

21. A method of performing communication by a user equipment (UE) configured with a plurality of cells in a wireless communication system, the method comprising:

receiving, in a first time interval (TI) of a first cell, a physical downlink control channel (PDCCH) including carrier indicator information for cross-carrier scheduling; and transmitting, in a second TI of a second cell, an uplink (UL) signal related to the PDCCH including the carrier indicator information, based on TI offset information, wherein each TI of the first cell is configured with 14 orthogonal frequency divisional multiplexing (OFDM)

symbols of the first cell, and each TI of the second cell is configured with 14 OFDM symbols of the second cell, wherein, based on a first subcarrier spacing (SCS) configured in the first cell being smaller than a second SCS configured in the second cell, a time length for 1 TI of the first cell is the same as a time length for multiple TIs of the second cell, and wherein the TI offset information denotes a TI offset value from an earliest one of multiple TIs of the second cell that overlap with the first TI of the first cell where the PDCCH is received, to the second TI where the UL signal is transmitted.

\* \* \* \* \*